US012536605B2

(12) United States Patent
Grover et al.

(10) Patent No.: US 12,536,605 B2
(45) Date of Patent: Jan. 27, 2026

(54) IDENTIFYING A DIGITAL WATERMARK IN AN IMAGE/VIDEO/AUDIO STREAM WHERE THE IMAGE HAS BEEN CONVERTED TO A DIFFERENT FORMAT

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 324 days.

(21) Appl. No.: 18/209,671

(22) Filed: Jun. 14, 2023

(65) Prior Publication Data

US 2024/0420272 A1 Dec. 19, 2024

(51) Int. Cl.
*G06T 1/00* (2006.01)
*G06T 7/90* (2017.01)

(52) U.S. Cl.
CPC .......... *G06T 1/0071* (2013.01); *G06T 1/0028* (2013.01); *G06T 7/90* (2017.01); *G06T 2201/0065* (2013.01); *G06T 2207/10016* (2013.01)

(58) Field of Classification Search
CPC ....... G06T 1/0071; G06T 1/0028; G06T 7/90; G06T 2201/0065; G06T 2207/10016; G06T 1/0021–0092; G06T 2201/005–0601; H04N 1/32144–32352
See application file for complete search history.

(56) References Cited

U.S. PATENT DOCUMENTS

2006/0072780 A1 4/2006 Zarrabizadeh

FOREIGN PATENT DOCUMENTS

WO  WO-02087251 A1 * 10/2002 ......... H04N 1/32208

* cited by examiner

*Primary Examiner* — Christopher Wait
(74) *Attorney, Agent, or Firm* — Sheridan Ross P.C.

(57) ABSTRACT

A visual media is received. For example, the received visual media may be a digital image, a video file, or a video stream. A plurality of colors in the visual media are identified. In response to identifying the plurality of colors in the visual media, one or more colors not in the visual media are identified. A watermark is placed in the visual media to produce a watermarked visual media. The watermark comprises at least one of the identified colors not in the visual media. The watermarked visual media is verified using image processing.

20 Claims, 3 Drawing Sheets

IDENTIFYING A DIGITAL WATERMARK IN AN IMAGE/VIDEO/AUDIO STREAM WHERE THE IMAGE HAS BEEN CONVERTED TO A DIFFERENT FORMAT

FIELD

The disclosure relates generally to digital watermarking and particularly to identifying digital watermarks where an image has been converted to a different format.

BACKGROUND

One problem with digital watermarks in an image/video/audio stream is that if the data is converted to a different format, the watermarks may be difficult to detect by comparing the digital data. For example, if an image is converted to a different format (e.g., to a PDF or has been compressed/uncompressed), because the format is different and/or has changed, it may be difficult to make the same comparison. Likewise, if the image is printed or the video stream is converted to analog and back, existing techniques may not work.

SUMMARY

These and other needs are addressed by the various embodiments and configurations of the present disclosure. The present disclosure can provide a number of advantages depending on the particular configuration. These and other advantages will be apparent from the disclosure contained herein.

A visual media is received. For example, the received visual media may be a digital image, a video file, or a video stream. A plurality of colors in the visual media are identified. In response to identifying the plurality of colors in the visual media, one or more colors not in the visual media are identified. A watermark is placed in the visual media to produce a watermarked visual media. The watermark comprises at least one of the identified colors not in the visual media. The watermarked visual media is verified using image processing.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims, a "visual media" may be any type of video media, such as, an image, a video file, a live video stream, and/or the like. The term visual media refers to visual media that has not been watermarked (unless indicated otherwise). When discussing visual media herein, in regard to video files/video streams, the reference may be to an individual frame in the video file/video stream.

The term watermarked visual media is visual media that has been watermarked using the processes described herein.

As described herein and in the claims, a "source" may be a person, a corporation, an entity, an owner, an artist, an organization, and/or the like. A source is an entity associated with a watermark that is used to watermark the media. For example, an artist may watermark an image and place a first watermark in a copy that is sent to the user X. The same artist may watermark the image with a second watermark that is sent to the user Y. Thus, based on the two watermarks, the artist can track if other copies (e.g., illegal copies) of the two images have been made of the copies sent to the user X and the user Y. In this example the user X is associated with the first watermark and the user Y is associated with the second watermark.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
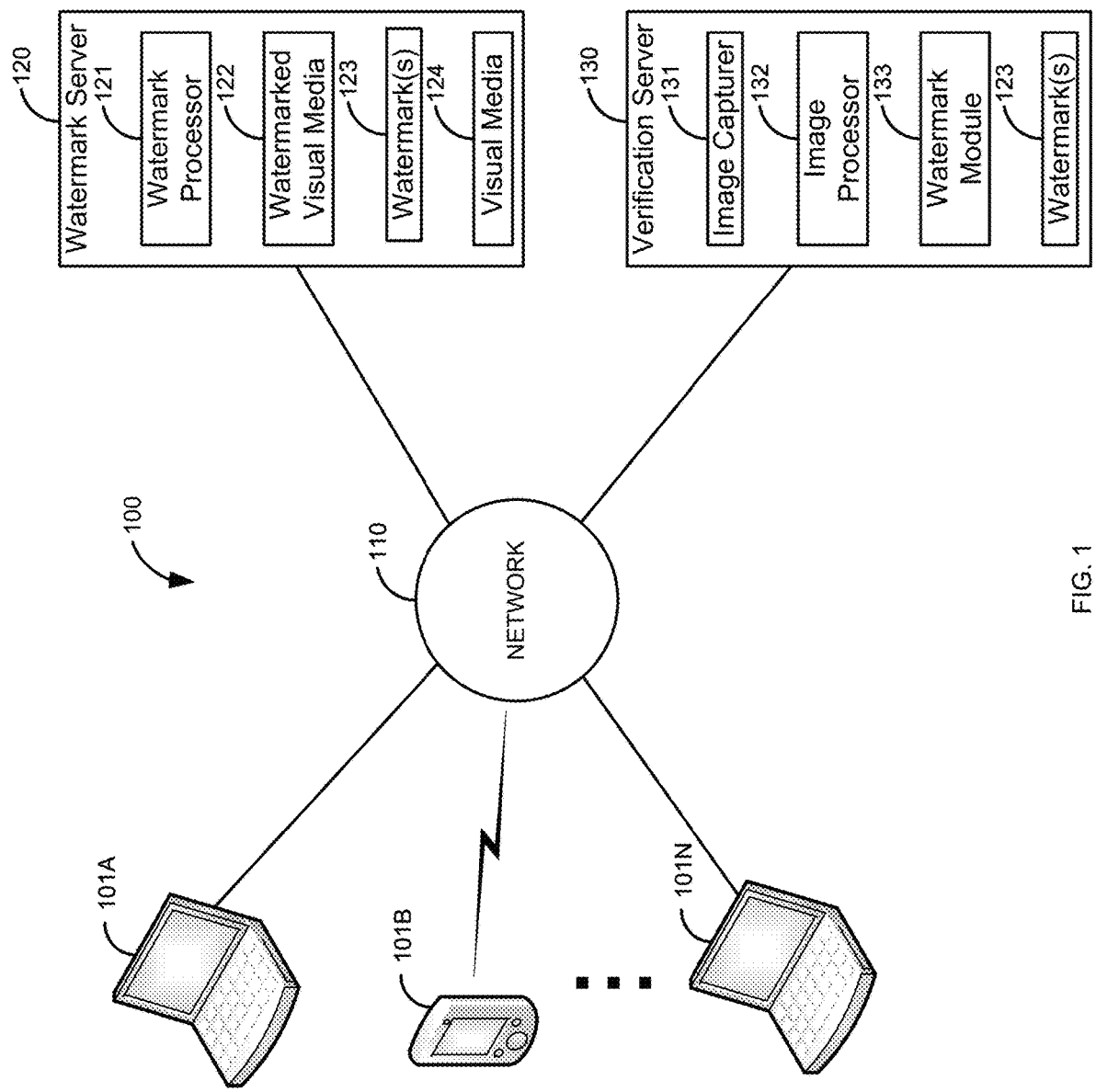
FIG. 1 is a block diagram of a first illustrative system for managing watermark(s) using image processing.

FIG. 1 is a block diagram of a first illustrative system 100 for managing watermarks 123 using image processing. The first illustrative system 100 comprises communication devices 101A-101N, a network 110, a watermark server 120, and a verification server 130.

The communication devices 101A-101N can be or may include any device that can communicate on the network 110, such as a Personal Computer (PC), a telephone, a video system, a cellular telephone, a Personal Digital Assistant (PDA), a tablet device, a notebook device, a smartphone, a server, an embedded device, and/or the like. As shown in FIG. 1, any number of communication devices 101A-101N may be connected to the network 110.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The watermark server 120 can be any device that can be used to manage watermarks 123. The watermark server 120 is used to place watermarks 123 into the visual media 124, such as images, video streams, and/or the like. Although not shown, the watermark server 120 may comprise the verification server 130. For example, instead of the verification server 130 being separate as shown in FIG. 1, there may be a single watermark server 120 that comprises a verification server 130. In addition, there may also be another separate verification server(s) 130 in addition to the verification server 130 in the watermark server 120. The watermark server 120 comprises a watermark processor 121, watermarked visual media 122, watermark(s) 123, and visual media 124.

The watermark processor 121 can be any hardware coupled with software that can manage/process the watermarks 123. The watermark processor 121 can manage the receipt of the visual media 124 and insert the watermark(s) 123 into the visual media 124.

The watermarked visual media 122 is any visual media 124 that has been watermarked. Different watermarked visual media 122 may have different watermarks 123 based on various factors. The different watermarks 123 may be based on different visual media 124 (e.g., two different images), based on different sources (e.g., associated with a specific user, company, artist, etc.), based on content of the visual media 124, based on a media type, and/or the like.

The watermark(s) 123 can be any type of visual watermark(s) 123 that are placed into the visual media 124. The watermark(s) 123 may be different based on user preferences. The user may define different color palates/ranges for the watermarks 123 based on the source. For example, the user may define a first color range for a first source and a second color range for a second source. The ranges may be for unused colors of an image/video stream. The watermarks 123 may be associated with a source. In one embodiment, the visual media 124 may have multiple watermarks 123, each associated with a different source. Alternatively, multiple copies of the visual media 124 may have unique watermarks 123, that each identify a unique source (e.g., with different unused colors).

The visual media 124 can be any type of video media. In one embodiment, the visual media 124 may initially have a different watermark 123 before a watermark(s) 123 described herein are added. The visual media 124 may be received from various sources, such as from the communication devices 101A-101N.

The verification server 130 can be any hardware coupled with software that can be used to verify the watermarks 123 in the visual media 124. The verification server 130 may comprise multiple verification servers 130 on the network 110. For example, there may be multiple verification servers 130 on different parts of the Internet. The verification server 130 further comprises an image capturer 131, an image processor 132, a watermark module 133, and watermarks 123.

The image capturer 131 can be any hardware/software that can capture images, such as a camera. The image capturer 131 may capture images using pixels being displayed on a video screen. The image capturer 131 captures visual media 124 that is used to see if the visual media 124 has a known watermark 123. The image capturer 131 may capture a displayed analog media stream. In one embodiment, the image capturer 131 may reside on the communication devices 101A-101N.

The image processor 132 can be or may include any hardware/software that can process images/visual media 124. The image processor 132 can be used to process images captured by the image capturer 131. The image processor 132 detects the watermark 123 based on the image (not based on the digital data) using digital signal processing. For example, the image may be a photograph, an analog stream, a compressed stream, a reformatted stream, a converted image, and/or the like.

The watermark module 133 can be or may include any hardware/software that can manage watermark(s) 123 on the verification server 130. The watermark module 133 uses the output of the image processor 132 to determine if the visual media 124 has any watermark(s) 123.

Figure 2:
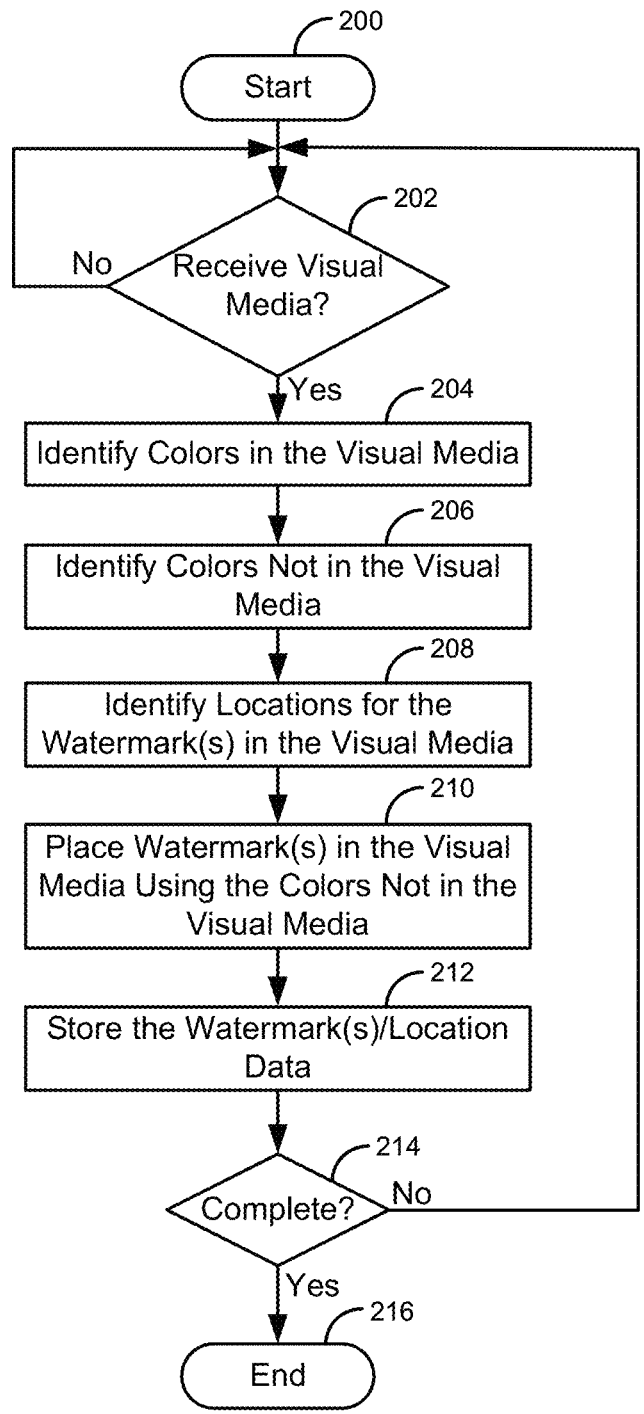
FIG. 2 is a flow diagram of a process for placing watermark(s) in visual media.
Figure 3:
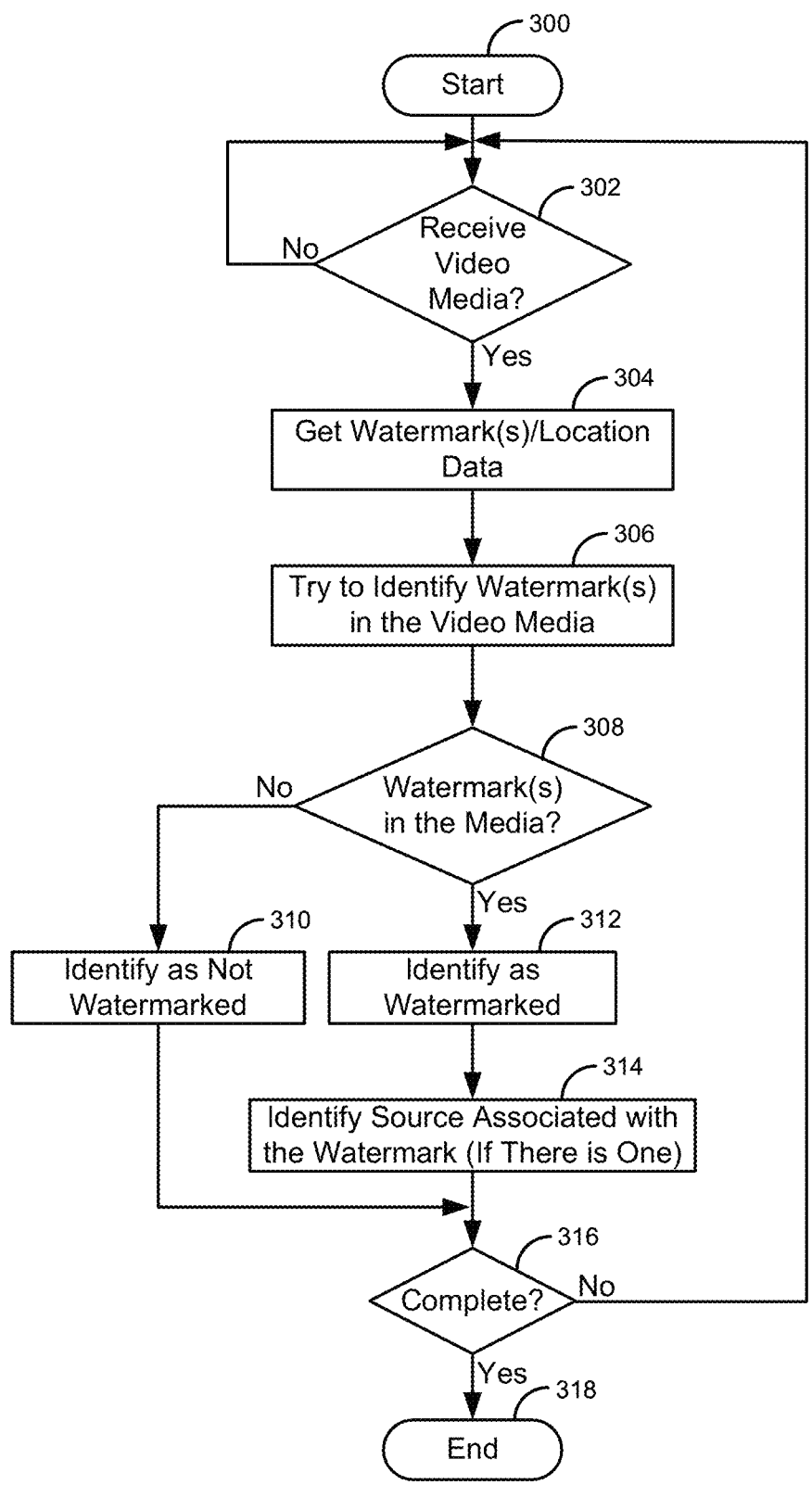
FIG. 3 is a flow diagram of a process for verifying watermark(s) in visual media using image processing.

FIG. 2 is a flow diagram of a process for placing watermark(s) 123 in visual media 124. Illustratively, the communication devices 101A-101N, the watermark server 120, the watermark processor 121, the verification server 130, the image capturer 131, the image processor 132, and the watermark module 133 are stored-program-controlled entities, such as a computer or microprocessor, which performs the method of FIGS. 2-3 and the processes described herein by executing program instructions stored in a computer readable storage medium, such as a memory (i.e., a computer memory, a hard disk, and/or the like). Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The process starts in step 200. The watermark processor 121 determines, in step 202, if any visual media 124 is received for processing. Receiving the visual media 124 in step 202 may occur in various ways, such as, via the network (e.g., from a communication device 101), via an indication from a user to place a watermark 123 in the visual media 124 (either locally or remotely), based on an image capture, and/or the like. The visual media 124 may be a single visual media 124 or may comprise multiple visual media 124. For example, multiple images or video files may be received in step 202. If the visual media 124 is not received in step 202, the process of step 202 repeats.

Otherwise, if a visual media 124 is received in step 202, the watermark processor 121 identifies colors in the visual media 124 in step 204. One way to accomplish step 204 is to scan the image/video stream (visual media 124) and determine all the colors used in the image/frame (if the visual media 124 is a video a stream/file). For example, if there is a 32-bit color (4,294,967,296 colors) scheme and the image is 10K×10K pixels (100 million pixels), the system can look at value of each pixel and identify all the used colors. Once the watermark processor 121 knows all the used colors in the image/video stream (visual media 124), the watermark processor 121 can then identify all the unused colors in the image/video (visual media 124) in step 206.

The watermark processor 121 identifies locations of the watermark(s) 123 in the visual media 124 in step 208. The watermark locations can then be used to place the watermark(s) 123 in the visual media 124 in step 210. For example, if the watermark 123 comprises the 100 pixels, the 100 pixels of the watermark 123 may each have a unique color (or all could have the same unique color or a combination). Existing techniques of placing the watermarks 123 can be used to place the unique color(s) into the visual image 124 in step 210. For example, changing a least significant bit (that provides a close grey scale/hue) may be used to obfuscate the watermark 123. Other techniques may be used, such as placing the watermark(s) 123 in specific locations in an image, placing multiple watermarks in an image, placing a separate watermark 123 in each frame if the visual media 124 is a stream/file, placing the watermark 123 (or different watermarks 123) in periodic frames, placing the watermark 123 over several frames, and/or the like.

In another embodiment, in order to abstract the watermark 123, the process may use a system that is based on an element of a first unique pixel and an offset to a location determined by the number of pixels in the watermark. In this example, the first pixel in the image had a Red/Green/Blue (RGB) value of [55, 118, 27] and the first three unused RGB colors are: [124, 205, 95], [222, 155, 201], [004, 089, 099]. The watermark 123 has 100 points in it and the file size is 239,470 bytes. The base modifier value may be calculated as size of image/100 or 2,394.7 (which we round up to 2,395). The formula for locating the first watermark pixel would look like this: RGB $1^{st}$ pixel value element+partial pixel value of first unused color+ (base modifier value*count of inserted pixels) (i.e. Offset to $1^{st}$ watermark=118+205+ (2395*1) bytes (2,718) into the image and would have a pixel value of [124,205,95]). The offset to the second unique color would be the $1^{st}$ offset+205+(2,718*2) or 5,641. The offset to the third unique color would be the $2^{nd}$ offset+155+ (2,718*3) or 8,309 and so on. In order to prevent pixel clipping or wrapping, when the value of the total partial pixel offset becomes>the base modifier value, the count or offset value multiplier index will revert back to 1. In order to locate in the watermark 123, the location of the first pixel used, and first unique pixel value would need to be stored. While the process could scan for single pixel occurrences, this would not yield a calculable watermark 123 because there could be a lot of single pixel occurrences.

In addition, the watermark(s) 123 may have markers in a video stream to give a point of reference so the watermark may be more easily identified. The unused colors may be changed to make the watermark 123 unique to identify a source of where the image came from to track it like is traditionally done today. In one embodiment, there may be multiple sources associated with the watermark 123. In this embodiment, the watermarked visual media 122 will have multiple watermarks 123, each associated with separate sources.

The watermark(s) 123 and the location data of the watermark(s) 123 are stored in step 212. The watermark(s) 123/location data is stored in a watermark record that indicates, for an image/video stream, locations of where the pixels were changed and how they have changed. For example, in an image, 100 different pixels may have been changed when placing the watermark(s) 123 in the image. The watermark record indicates the location of the 100 pixels and the specific color of each of the locations in the image.

The watermark processor 121 determines, in step 214, if the process is complete. If the process is not complete in step 214, the process goes to step 202 to wait to receive the visual media 124. Otherwise, if the process is complete in step 214, the process ends in step 216.

The process described in FIG. 2 may be done in real-time. For example, the watermark(s) 123 may be inserted into a live video stream in real-time where the watermark server 120 is receiving the live video stream in real-time, inserting the watermark(s) 123 in real-time, and then sending the watermarked video stream in real-time.

FIG. 3 is a flow diagram of a process for verifying watermark(s) 123 in visual media 124 using image processing. The process starts in step 300. The image processor 132 waits in step 302 to receive visual media 124. When discussing receiving visual media 124 in FIG. 3, the visual media 124 may include visual media 124 or watermarked visual media 122. The visual media 124 may be received in various ways, such as from a communication device 110, from a camera taking a picture of an image, receiving an analog video stream, receiving an image that is now in a different format, and/or the like. If the visual media 124 is not received in step 302, the process of step 302 repeats.

Otherwise, if the visual media 124 has been received in step 302, the watermark module 133 gets the watermark(s) 123/location data, in step 304, that is associated with the watermarked visual media 122. The watermark module 133 tries to identify the watermark(s) 123 in the visual media 124 in step 306. If the format of the watermarked visual media 122 has changed, the locations of the pixels/watermark(s) 123 may have also changed, thus traditional watermarking techniques may not work. Because the watermark 123 has unique color(s), the watermark(s) 123 can be more easily distinguished if the visual media 124 is actually watermarked visual media 122.

The watermark module 133 may use various technique(s)/threshold(s) to identify the watermark(s) 123 in the visual media 124. For example, the watermark module 133 can check the locations where the watermark 123 was inserted into an image. If the watermark 123 is a specific color not originally in the image, the image is scanned (using image processing, not the digital data) for the specific unique color(s). If the image is a video stream, each frame can be scanned for the unique color(s). For video streams, the watermarking process could encode several frames with the same watermark 123 at the same locations so that it is easier to identify using visual processing. In one embodiment, each frame may have unique color(s). The watermark 123 may be on a website, in a document (e.g., a PDF), a displayed Word document, in a video stream, in a trademark, etc. Because the colors are unique, if the image size has changed or has been reformatted, the unique color(s) should still be able to be able to be identified. If the image can be scrolled, the scrolled image is scanned to identify the color(s). A threshold may be used to determine the presence of the watermark 123. For example, if 80% of the 100 unique color(s) are detected in the correct locations, this would indicate that the image likely has the watermark 123. This would help where the image/video stream has degraded.

If the color palette or scheme is changed, this process can identify potential watermark(s) 123 based on the shift, based on a grey scale, and/or based on the color palette. For example, if the shift was a linear shift in the color palette, (i.e., all pixels are shifted five points to the right), then the watermark 123 would still have unique values. If the shift was a programmatic shift, they may or may not have a corresponding mapping (i.e., before the color palette change-bit 1 was 255,0,0, bit 2 was 0,255,0 after color palette change bit 1 is 127,0,0, bit 2 is 128,0,0 and thus the delta between bits would no longer be able to be mapped). In addition, an editor (e.g., like Adobe's Lightroom™) can be used to process images/watermark(s) 123 based on a pattern that is shifted by an amount.

If the watermark(s) 123 are not in the visual media 124 in 308, the watermark module 133 identifies the visual media 124 as not watermarked in step 310 and the process goes to step 316. Otherwise, if the visual media 122 is watermarked, the visual media 124 is identified as watermarked visual media 122 in step 312. Because the visual media 122 is watermarked using unused colors, if the original format of the visual media 122 has changed (e.g., from a TIF to a GIF, been compressed, or any conversion where the watermarked visual media 122 is now different), the watermark(s) can be more easily identified. For example, a change in format may shift the pixels. In this case, the system could easily identify a pixel shift because the unused colors would be shifted when using the actual colors of each pixel. If there is a loss of a portion of the watermark 123, the process could still identify the remaining unused colors to indicate that the watermarked visual media 122 still has the watermark 123.

The watermark module 133 identifies, in step 314, if there is a source associated with the watermark 123 and the process then goes to step 316. For example, a source may be associated with the watermark 123 to identify if the watermarked visual media 122 has been illegally copied.

The watermark module 133 determines, in step 316, if the process is complete. If the process is not complete in step 316, the process goes back to step 302. Otherwise, the process ends in step 318.

In FIGS. 2-3, the watermark(s) 123 may be encrypted and then unencrypted to validate source. For example, each source may have the image watermarked with unique color(s) in the same locations and/or different locations. The encryption may use a unique source encryption key that is associated with the source.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i-4770K 22 nm Haswell, Intel® Core i5-3570K 22 nm Ivy Bridge, the AMD® FX™ family of processors, AMD® FX-4300, FX-6300, and FX-8350 32 nm Viscera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive a visual media;
identify a plurality of colors in the visual media;
in response to identifying the plurality of colors in the visual media, identify one or more colors not in the visual media; and
place a first watermark in the visual media to produce a watermarked visual media, wherein the first watermark comprises at least one of the identified one or more colors not in the visual media and wherein the watermarked visual media is verified using image processing.

2. The system of claim 1, wherein the first watermark is associated with a source.

3. The system of claim 2, wherein the source comprises a plurality of sources and wherein a plurality of copies of the visual media are watermarked with different watermarks based on a particular source of the plurality of sources.

4. The system of claim 3, wherein each of the different watermarks comprises at least one different unique color of the identified one or more colors not in the visual media.

5. The system of claim 3, wherein each of the different watermarks are encrypted using a unique source encryption key.

6. The system of claim 1, wherein the visual media is a video stream or video file, and wherein the first watermark in the watermarked visual media is verified from one or more captured frames of the video stream.

7. The system of claim 1, wherein the visual media is a video stream or video file, wherein a plurality of watermarks are placed into the video stream, and wherein the plurality of watermarks placed into the video stream are each based on colors not in individual frames in the video stream.

8. The system of claim 1, wherein the watermarked visual media that is verified using the image processing has changed based on one or more of: a linear shift in a color palate, a programmatic shift, and being inserted into a new document.

9. The system of claim 1, wherein the least one of the identified one or more colors not in the visual media is selected based on a user defined range associated with a source.

10. The system of claim 1, wherein the first watermark identifies a first source and wherein the first watermark comprises a plurality of watermarks, each associated with a different source.

11. The system of claim 1, wherein placing the first watermark in the visual media to produce the watermarked visual media uses an offset to a location determined by a number of pixels in the first watermark.

12. A method comprising:
receiving, by a microprocessor, a visual media;
identifying, by the microprocessor, a plurality of colors in the visual media;
in response to identifying the plurality of colors in the visual media, identifying, by the microprocessor, one or more colors not in the visual media; and
placing, by the microprocessor, a first watermark in the visual media to produce a watermarked visual media, wherein the first watermark comprises at least one of the identified one or more colors not in the visual media and wherein the watermarked visual media is verified using image processing.

13. The method of claim 12, wherein the first watermark is associated with a source.

14. The method of claim 13, wherein the source comprises a plurality of sources and wherein a plurality of copies of the visual media are watermarked with different watermarks based on a particular source of the plurality of sources.

15. The method of claim 14, wherein each of the different watermarks comprises at least one different unique color of the identified one or more colors not in the visual media.

16. The method of claim 12, wherein the visual media is a video stream or video file, and wherein the first watermark in the watermarked visual media is verified from one or more captured frames of the video stream.

17. The method of claim 12, wherein the visual media is a video stream or video file, wherein a plurality of watermarks are placed into the video stream, and wherein the plurality of watermarks placed into the video stream are each based on colors not in individual frames in the video stream.

18. The method of claim 12, wherein the watermarked visual media that is verified using the image processing has changed based on one or more of: a linear shift in a color palate, a programmatic shift, and being inserted into a new document.

19. A system comprising:
a microprocessor; and
a computer readable medium, coupled with the microprocessor and comprising microprocessor readable and executable instructions that, when executed by the microprocessor, cause the microprocessor to:
receive a visual media;
get one or more watermarks associated with the received visual media, wherein the one or more watermarks comprise one or more colors not in the received visual media before the visual media was watermarked;
identify if the one or more watermarks associated with the received visual media are in the received visual media;
in response to identifying that the one or more watermarks are in the received visual media, identifying the received visual media as being watermarked; and
in response to identifying that the one or more watermarks are not in the received visual media, identifying the received visual media as not being watermarked.

20. The system of claim 19, wherein the one or more watermarks are associated with a source and wherein at least some of the one or more colors not in the received visual media are associated with the source.

* * * * *